United States Patent
Koenig et al.

[15] 3,671,571
[45] June 20, 1972

[54] BISCARBAMATES

[72] Inventors: Karl-Heinz Koenig, Ludwigshafen; Gustav Steinbrunn, Schwegenheim; Hermann Windel, Frankenthal; Adolf Fischer, Mutterstadt, all of Germany

[73] Assignee: Badische Anilin- & Soda-Fabrik Aktiengesellschaft, Ludwigshafen (Rhine), Germany

[22] Filed: July 17, 1970

[21] Appl. No.: 55,984

Related U.S. Application Data

[63] Continuation-in-part of Ser. No. 649,097, June 27, 1967, Pat. No. 3,551,477.

[52] U.S. Cl. .................................. 260/471 C, 71/111

[51] Int. Cl. .................................................. C07c 125/06
[58] Field of Search .................................. 260/471 C

[56] References Cited

UNITED STATES PATENTS 3,404,975  10/1968  Wilson et al. .................. 260/471 C Primary Examiner—Lorraine A. Weinberger
Assistant Examiner—L. Arnold Thaxton
Attorney—Johnston, Root, O'Keeffe, Keil, Thompson & Shurtleff

[57] ABSTRACT

Biscarbamates and their use for controlling undesirable plant growth.

3 Claims, No Drawings

BISCARBAMATES

This application is a continuation-in-part of application Ser. No. 649,097, filed June 27, 1967 now U.S. Pat. No. 3,551,477.

The present invention relates to biscarbamates, in particular phenyl-substituted biscarbamates, and to a method for controlling unwanted plants with said compounds.

It is known that N-3,4-dichlorophenylmethyl carbamate may be used for controlling unwanted plants. However its action is not satisfactory.

An object of the present invention is to provide new carbamates which have an excellent herbicidal action. A further object of the invention is to provide a method for controlling unwanted plants with said bicarbamates.

These and other objects of the invention are achieved with biscarbamates having the formula

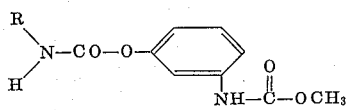

in which R denotes 1-chloromethylpropyl or 2,2-dimethyl-2-chloroethyl.

The new compounds are readily crystallizable products which have a good herbicidal action. They are effective for both selective and total control of plants. Herbicidal agents are obtained by mixing the active ingredients with conventional solid or liquid carriers.

The process for the preparation of the new compounds proceeds according to the general equation: a or b.

(a)

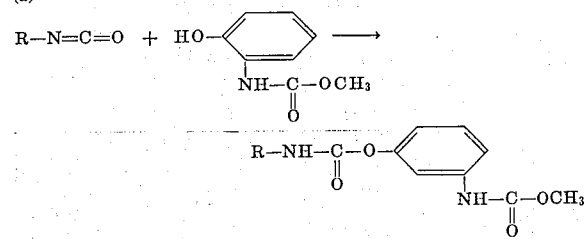

(b)

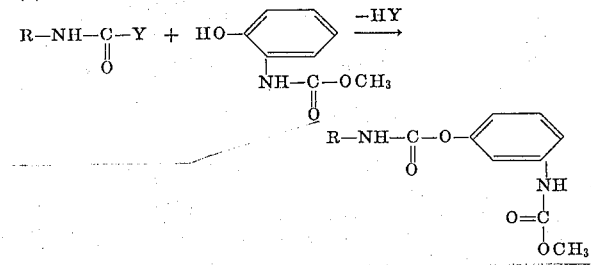

in which R has the meanings given above and Y denotes chlorine or bromine.

The reaction according to the invention of the two starting materials is carried out in solution, indifferent solvents, such as dioxane, tetrahydrofuran, ethers, hydrocarbons and chlorobenzene, being used. The reaction is carried out at temperatures between 15° and 150° C., preferably between 30° and 80° C. Approximately equivalent amounts of the two starting materials are used. The reaction with the carbamic acid halide takes place in the presence of an acid binding agent, e.g., a tertiary amine, aminoalcohol, alkali metal alcoholate, alkali metal carbonate or alkali metal hydroxide.

The reactions according to the invention are illustrated by the following examples in which parts are parts by weight unless otherwise specified.

EXAMPLE 1

4,970 parts by weight of 1-(chloromethyl)-propylamine hydrochloride - prepared from 2-aminobutanol-(1), gaseous hydrogen chloride and thionyl chloride in toluene — is suspended in benzene (16 parts by weight) and treated with phosgene at 70° to 80° C. until all the hydrochloride has dissolved. The whole is allowed to cool, excess phosgene is expelled with nitrogen, the benzene is distilled off, and the liquid residue distilled in a column packed with Raschig rings. There is obtained 3,960 parts by weight (86 percent of the theory) of 1-chloromethyl)-propyl isocyanate having a boiling point at 20 mm Hg of 60° to 61° C.

Seventeen parts by weight of 3-(methoxycarbonylamido)-phenol is dissolved in 150 parts by weight of toluene. One part by weight of triethylamine is added as catalyst, and, at 70° to 80° C., 14 parts by weight of α-(chloromethyl)-propyl isocyanate is dripped into the reaction mixture. The mixture is kept under reflux for a further 4 hours, the precipitated biscarbamate is suction filtered in the cold and recrystallized from benzene. The product, which melts at 145° to 146° C., has the following formula:

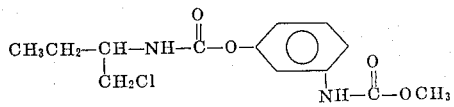

EXAMPLE 2

890 parts by weight of monoisobutanolamine (= 1-amino-2-methylpropanol-2) prepared from isobutylene oxide and ammonia is dissolved in 2,000 parts by weight of benzene and saturated at 40° to 50° C., with hydrogen chloride down to pH 1. At 60° to 80° C., 800 parts by volume of thionyl chloride is dripped in; phosgene is then gassed in until all the precipitated salt has gone into solution. After expelling the phosgene and distilling off the benzene, the 2,2-dimethyl-2-chloroethyl isocyanate boils at 48° to 50° C. (18 mm Hg).

Seventeen parts by weight of 3-(methoxycarbonylamido)-phenol is dissolved in 150 parts by weight of toluene. One part by weight of triethylamine is added as catalyst, and, at 70° to 80° C., 14 parts by weight of 2,2-dimethyl-2-chloroethyl isocyanate is dripped into the reaction mixture. The mixture is kept under reflux for a further 6 hours, the precipitated biscarbamate is suction filtered in the cold and recrystallized from benzene. The product, which melts at 147° to 148° C., has the following formula:

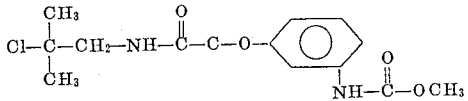

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g., tetrahydronaphthalene or alkylated naphthalenes, or organic liquids having boiling points higher than 150° and having one or more than one functional group, e.g., the keto group, the ether group, the ester group or the amide group, this group or these groups being attached as substituent (s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kieselguhr, talc, clay or fertilizers.

The following experiments illustrate the good action of the compounds prepared according to the invention.

EXAMPLE 3

Loamy sandy soil is filled into pots and sown with the seeds of Triticum vulgare, Zea mays, Poa annua, Alopecurus myosuroides, Echinochloa crus-galli, Matricaria chamomilla and Sinapis arvensis. The soil prepared in this manner is then treated with 1.5 kg per hectare of each of the following active ingredients, each active ingredient being dispersed in 500 liter of water per hectare:

I  N-(1-chloromethylpropyl)-carbamic acid-(m-carbomethoxyaminophenyl)-ester;

II  N-(2,2-dimethyl-2-chloroethyl)-carbamic acid-(m-carbomethoxyaminophenyl)-ester; and, for comparison, III  N-(1-$\beta$-chloroethyl)-carbamic acid-(m-carbomethoxyaminophenyl)-ester.

It is ascertained that compounds I and III have a good action on broadleaved and grassy weeds, whereas III has only a weak herbicidal action.

The results of the experiment are given in the following table:

|  | Active ingredient | | |
|---|---|---|---|
|  | I | II | III |
| Triticum vulgare | 5 | 0 | 0 |
| Zea mays | 5 | 0 | 0 |
| Poa annua | 95 | 80 | 10 |
| Alopecurus myosuroides | 80 | 75 | 15 |
| Echinochloa crus-galli | 80 | 70 | 10 |
| Matricaria chamomilla | 90 | 85 | 30 |
| Sinapis arvensis | 90 | 80 | 30 |

0 × no action    100 × complete destruction

EXAMPLE 4

The plants Triticum vulgare, Zea mays, Poa annua, Alopecurus myosuroides, Echinochloa crus-galli, Matricaria chamomilla and Sinapis arvensis are sown in loamy sandy soil and treated with 1.5 kg per hectare of each of I, II and III, each of these active ingredients being dispersed in 500 liters of water per hectare.

It is ascertained that compounds I and II have a stronger herbicidal action than III.

The results of the experiment are given in the following table:

|  | Active ingredient | | |
|---|---|---|---|
|  | I | II | III |
| Triticum vulgare | 5 | 10 | 5 |
| Zea mays | 5 | 5 | 0 |
| Poa annua | 90 | 80 | 20 |
| Alopecurus myosuroides | 80 | 65 | 25 |
| Echinochloa crus-galli | 80 | 75 | 20 |
| Matricaria chamomilla | 90 | 80 | 60 |
| Sinapis arvensis | 90 | 80 | 70 |

0 × no damage    100 × complete destruction

EXAMPLE 5

70 parts by weight of the compound from Example 1 is mixed with 30 parts by weight of N-methyl-$\alpha$-pyrrolidone. A mixture is obtained which is suitable for application in the form of very fine drops.

EXAMPLE 6

Twenty parts by weight of the compound from Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

Twenty parts by weight of the compound from Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

Twenty parts by weight of the compound from Example 2 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 9

Twenty parts by weight of the compound from Example 1 is well mixed with 3 parts by weight of the sodium salt of diisobutylnaphthalene-$\alpha$-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0,1 percent by weight of the active ingredient.

EXAMPLE 10

Three parts by weight of the compound from Example 2 is intimately mixed with 97 parts by weight of particulate kaolin. A dust is obtained containing 3 percent by weight of the active ingredient.

EXAMPLE 11

Thirty parts by weight of the compound from Example 1 is intimately mixed with a mixture consisting of 92 parts by weight of powdered silica gel and eight parts by weight of paraffin oil which has been sprayed onto the surface of this silica gel. A formulation of the active ingredient is obtained having good adherence.

We claim:

1. Biscarbamates having the formula

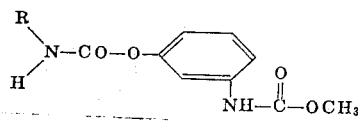

in which R denotes 1-chloromethylpropyl or 2,2-dimethyl-2-chloro-ethyl.

2. 3-(1'-chloromethylpropylcarbamoyl)-hydroxyphenylmethyl carbamate.

3. 3-(2',2'-dimethyl-2'-chloroethylcarbamoyl)-hydroxyphenylmethyl carbamate.

* * * * *

UNITED STATES PATENT OFFICE
CERTIFICATE OF CORRECTION

Patent No. 3,671,571           Dated June 20, 1972

Inventor(s) Karl-Heinz Koenig et al

It is certified that error appears in the above-identified patent and that said Letters Patent are hereby corrected as shown below:

Column 1, equations a and b, those portions of the formulae reading " 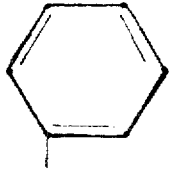 " should read -- 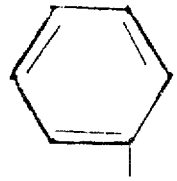 --.

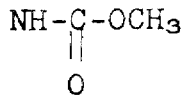  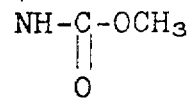

Column 3, line 24, "I and III" should read -- I and II --; line 38, "Oxno action   100xcomplete destruction" should read -- O=no action   100=complete destruction --; line 59, "O x no damage   100 x complete destruction " should read -- ∅=no damage   100 = complete destruction --.

Signed and sealed this 19th day of December 1972.

(SEAL)
Attest:

EDWARD M. FLETCHER, JR.                ROBERT GOTTSCHALK
Attesting Officer                      Commissioner of Patents